(12) United States Patent
Irwin et al.

(10) Patent No.: US 10,604,224 B2
(45) Date of Patent: Mar. 31, 2020

(54) AIRCRAFT BAY BLANKETS THAT PROVIDE ENHANCED DRAINAGE FEATURES

(71) Applicant: The Boeing Company, Chicago, IL (US)

(72) Inventors: Robert M. Irwin, Woodinville, WA (US); Mark L. Larson, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 962 days.

(21) Appl. No.: 14/993,402

(22) Filed: Jan. 12, 2016

(65) Prior Publication Data

US 2017/0197698 A1    Jul. 13, 2017

(51) Int. Cl.
  *B64C 1/06*     (2006.01)
(52) U.S. Cl.
  CPC .................... *B64C 1/067* (2013.01)
(58) Field of Classification Search
  CPC .................. B64C 1/066; B64C 1/067
  See application file for complete search history.

(56) References Cited

U.S. PATENT DOCUMENTS

| | | | | |
|---|---|---|---|---|
| 2,960,196 A * | 11/1960 | Meserole | ................ | E04C 2/384 49/480.1 |
| 3,003,902 A * | 10/1961 | McDuff | ................... | E04C 2/292 29/463 |
| 8,616,498 B2 * | 12/2013 | Hossain | ................... | B32B 27/12 244/121 |
| 8,662,448 B2 * | 3/2014 | Weston | ..................... | B64C 1/40 244/119 |
| 8,857,562 B2 * | 10/2014 | Morgan | ................... | B64C 1/403 181/284 |
| 8,882,041 B2 * | 11/2014 | Mueller | .................... | B64C 1/40 244/121 |
| 8,899,519 B2 * | 12/2014 | Smith | ........................ | B64C 1/40 244/117 R |
| 9,211,945 B2 * | 12/2015 | Redecker | ................ | B64C 1/067 |
| 10,023,286 B2 * | 7/2018 | Dickson | ................... | B64C 1/40 |

(Continued)

OTHER PUBLICATIONS

AERO: Controlling Nuisance Moisture, Copyright The Boeing Company, Aug. 27, 2015.

(Continued)

*Primary Examiner* — Assres H Woldemaryam
*Assistant Examiner* — Aaron M Rodziwicz
(74) *Attorney, Agent, or Firm* — Duft & Bornsen, PC (57) ABSTRACT

Systems and methods are provided for insulation and moisture drainage. One exemplary embodiment is a bay blanket configured to insulate an aircraft. The bay blanket includes insulation, and a first trough running along a length of a leftward face of the insulation and adapted to receive water draining from an outboard side of the insulation. The first trough includes sidewalls that meet at an inboard side of the insulation and extend from the inboard side to the outboard side. The bay blanket also includes a second trough running along a length of a rightward face of the insulation and adapted to receive water draining from the outboard side. The second trough includes sidewalls that meet at the inboard side and extend from the inboard side to the outboard side.

22 Claims, 12 Drawing Sheets

(56) References Cited

U.S. PATENT DOCUMENTS

| | | | |
|---|---|---|---|
| 2005/0211839 A1* | 9/2005 | Movsesian | B64C 1/40 244/119 |
| 2006/0284014 A1* | 12/2006 | Muller | A62C 2/06 244/119 |
| 2009/0090812 A1* | 4/2009 | Boock | B64C 1/40 244/1 N |
| 2013/0161123 A1* | 6/2013 | Morgan | E04B 1/84 181/175 |
| 2013/0299630 A1 | 11/2013 | Redecker et al. | |
| 2017/0144743 A1* | 5/2017 | Dickson | B64C 1/40 |

OTHER PUBLICATIONS

Boeing, Foam Diverters for Wire Harnesses, Section 8 Flight Deck and Main Cabin Moisture Seals, DBC_1_403Z5025-1, 8-45, 8-46 Rev AW.
Coil Spring, https://en.wikipedia.org/wiki/Coil_spring, Dec. 3, 2015.
GD-Flex, DN25 Flexible Corrugated Stainless Steel Tube, http://gdflex.en.alibaba.com/product/57208315-210442976/DN25_flexible_corrugated_stainless_steel_tube_html, Dec. 3, 2015.
U.S. Appl. No. 14/885,041.
U.S. Appl. No. 14/945,988.
Canadian Office Action. Application No. 2947185. dated Oct. 4, 2019.

* cited by examiner

FIG. 11
PERSPECTIVE

FIG. 12
SIDE

FIG. 13
TOP

AIRCRAFT BAY BLANKETS THAT PROVIDE ENHANCED DRAINAGE FEATURES

FIELD

The disclosure relates to the field of insulation, and in particular, to insulation for aircraft.

BACKGROUND

Aircraft may use insulation to prevent internal components from experiencing substantial temperature shifts when the aircraft changes elevation between landing and flight. The insulation also helps during sustained flight at flight altitude, and while the aircraft is located on the ground in hot weather or cold weather. For example, aircraft insulation in a cabin of a passenger aircraft ensures that passengers remain comfortable even when the temperature outside the aircraft varies substantially.

While an aircraft is in flight, moisture condenses out of the air and freezes to form ice crystals on the inside surface of the skin of the aircraft. When the skin of the aircraft is exposed to above-freezing temperatures, the ice crystals can melt. The water drips off of the skin of the aircraft and onto insulation blankets. There are penetrations/holes in the insulation blankets. Hence, the water running on top of the insulation can leak through these penetrations and drip onto the cabin interior, including ceilings and stowage bins. If this water gets past the ceiling and stowage bins, it can drip into the passenger cabin or cargo area, which is undesirable.

SUMMARY

Embodiments described herein enhance aircraft insulation by providing enhanced drainage features for aircraft bay blankets that insulate bays within the frame of an aircraft. The bay blankets described herein include troughs that extend from an inboard side of the bay blanket to an outboard side of the bay blanket. This ensures that water that drips onto the bay blanket from the skin of an aircraft enters the waterproof troughs and is directed away from the aircraft cabin. In short, dripping moisture is trapped within the troughs and drains without entering the aircraft cabin.

One exemplary embodiment is a bay blanket configured to insulate an aircraft. The bay blanket includes insulation, and a first trough running along a length of a leftward face of the insulation and adapted to receive water draining from an outboard side of the insulation. The first trough includes sidewalls that meet at an inboard side of the insulation and extend from the inboard side to the outboard side. The bay blanket also includes a second trough running along a length of a rightward face of the insulation and adapted to receive water draining from the outboard side. The second trough includes sidewalls that meet at the inboard side and extend from the inboard side to the outboard side.

A further exemplary embodiment is an apparatus that includes a frame of an aircraft and a bay blanket to insulate the aircraft. The bay blanket includes insulation and a first trough running along a length of a leftward face of the insulation and adapted to receive water draining from an outboard side of the insulation. The first trough includes sidewalls that meet at an inboard side of the insulation and extend from the inboard side to the outboard side. The bay blanket also includes a second trough running along a length of a rightward face of the insulation and adapted to receive water draining from the outboard side. The second trough includes sidewalls that meet at the inboard side and extend from the inboard side to the outboard side. The apparatus also includes securement straps that are threaded through the frame and affix the bay blanket to the aircraft.

A further embodiment is a method of draining water for an aircraft. The method includes receiving water along an outboard surface of a bay blanket that includes insulation. The method further includes receiving water draining from the outboard side of the bay blanket into troughs running along sides of the bay blanket, and draining water along the troughs of the bay blanket downward towards a drain of the aircraft.

A further embodiment is a method for installing a bay blanket. The method includes selecting a bay blanket comprising insulation and troughs that extend from an inboard side of the insulation towards an outboard side of the insulation, and orienting the bay blanket for the troughs to receive moisture draining from an outboard portion of the bay blanket. The method further includes affixing the bay blanket to a frame of the aircraft while the blanket is oriented for the troughs to receive water from an outboard side of the bay blanket.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
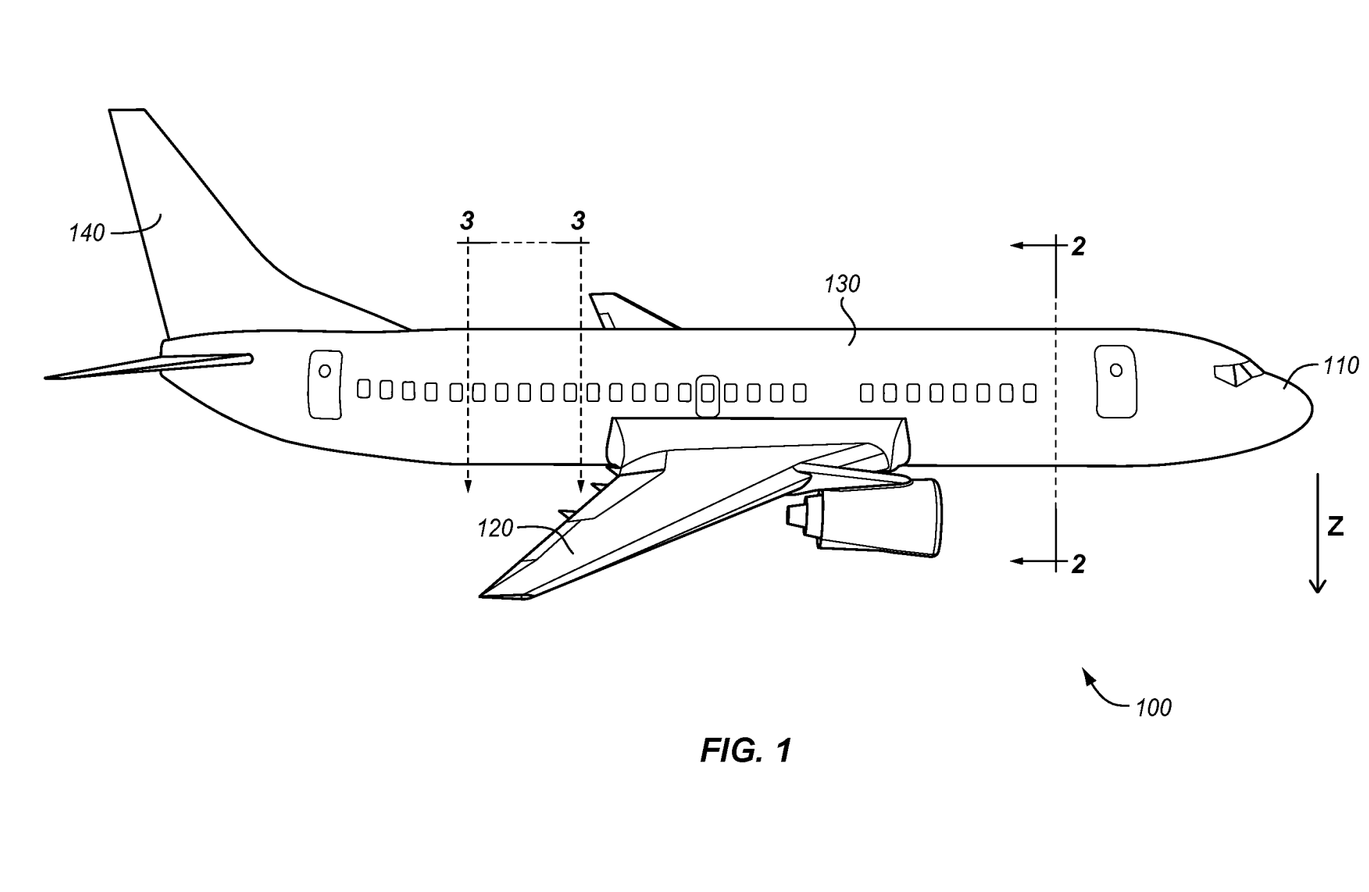
FIG. 1 is a diagram of an aircraft in an exemplary embodiment.

FIGS. 1-4 illustrate moisture flow in an exemplary aircraft, while FIGS. 5-14 illustrate systems that reduce the potential for condensed moisture to enter the cabin of an exemplary aircraft. FIG. 1 is a diagram of an aircraft 100 in an exemplary embodiment. Aircraft 100 includes nose 110, wings 120, fuselage 130, and tail 140. FIG. 1 also illustrates a downward direction (Z) indicating the expected direction in which the force of gravity will pull liquid water on aircraft 100.

Figure 2:
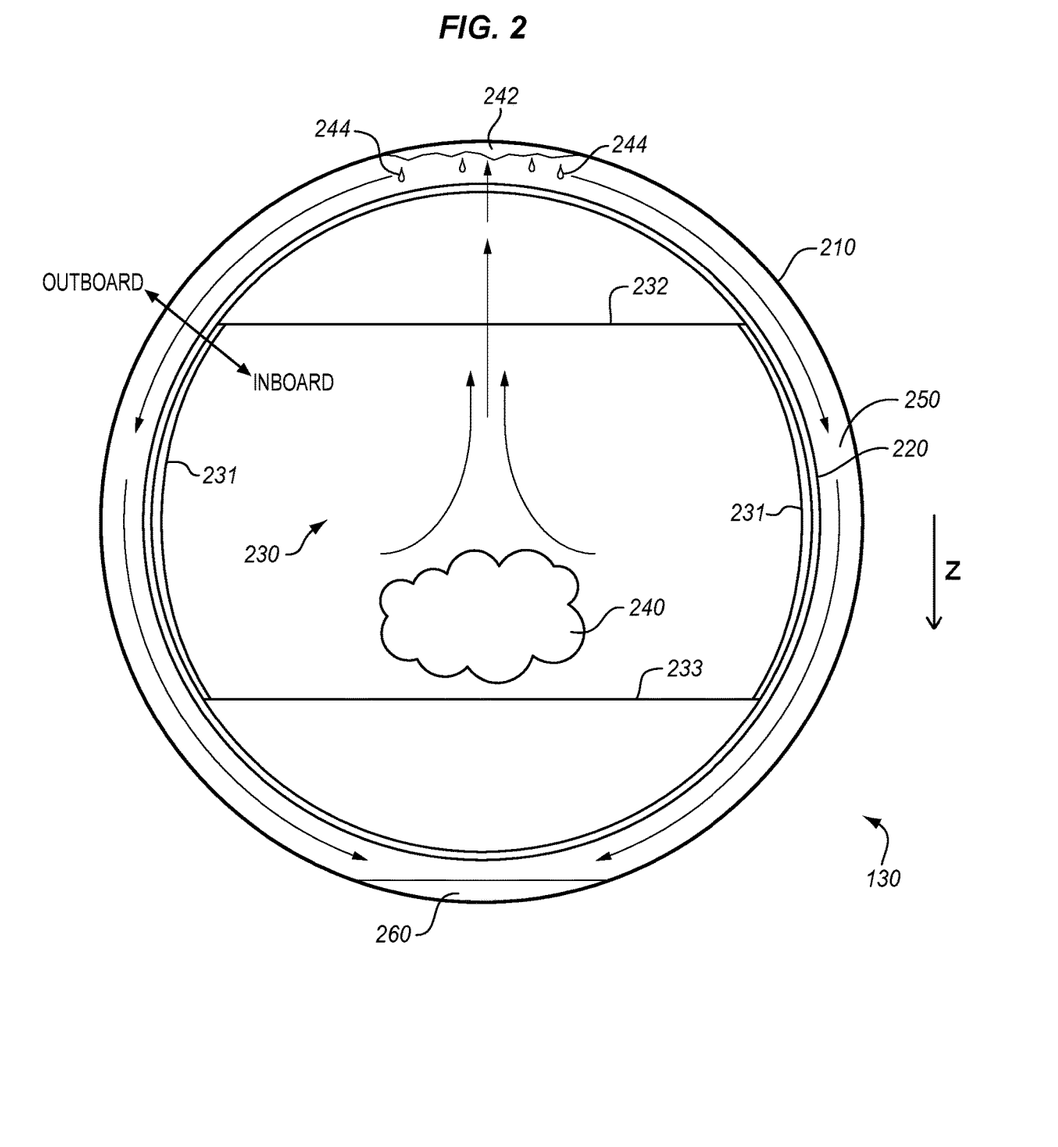
FIG. 2 is a diagram illustrating moisture flow in an aircraft in an exemplary embodiment.

FIG. 2 is a cross-section view of aircraft 100 indicated by view arrows 2 in FIG. 1. FIG. 2 illustrates a circular portion of aircraft fuselage 130. Fuselage 130 includes floor 233, ceiling 232, and sidewalls 231. As shown in FIG. 2, an outboard direction proceeds towards an external surface of aircraft 100. An inboard direction proceeds towards the interior of aircraft 100. Passengers in aircraft 100 may congregate in cabin 230 during flight. Inside of fuselage 130 (e.g., in cabin 230), passenger respiration and other sources of water cause moisture 240 to enter the air in cabin 230. For example, warm exhaled air includes moisture 240 and rises upward. Some of this air rises through ceiling 232. Furthermore, some warm air continues to rise upward through insulation 220 into a space 250 between insulation 220 and aircraft skin 210.

At high altitude, skin 210 is cooled by the outside air to below freezing temperatures. This causes water to condense out of the air and freeze onto skin 210 as ice 242. The ice 242 can melt into water droplets 244. These droplets 244 travel through space 250 into drainage channel 260. Other water droplets 244 may pass through insulation 220 and drip from ceiling 232 onto passengers. This is undesirable for the passengers. The size of space 250 has been substantially exaggerated in FIG. 2 in order to highlight the path through which droplets 244 are intended to travel.

Figure 3:
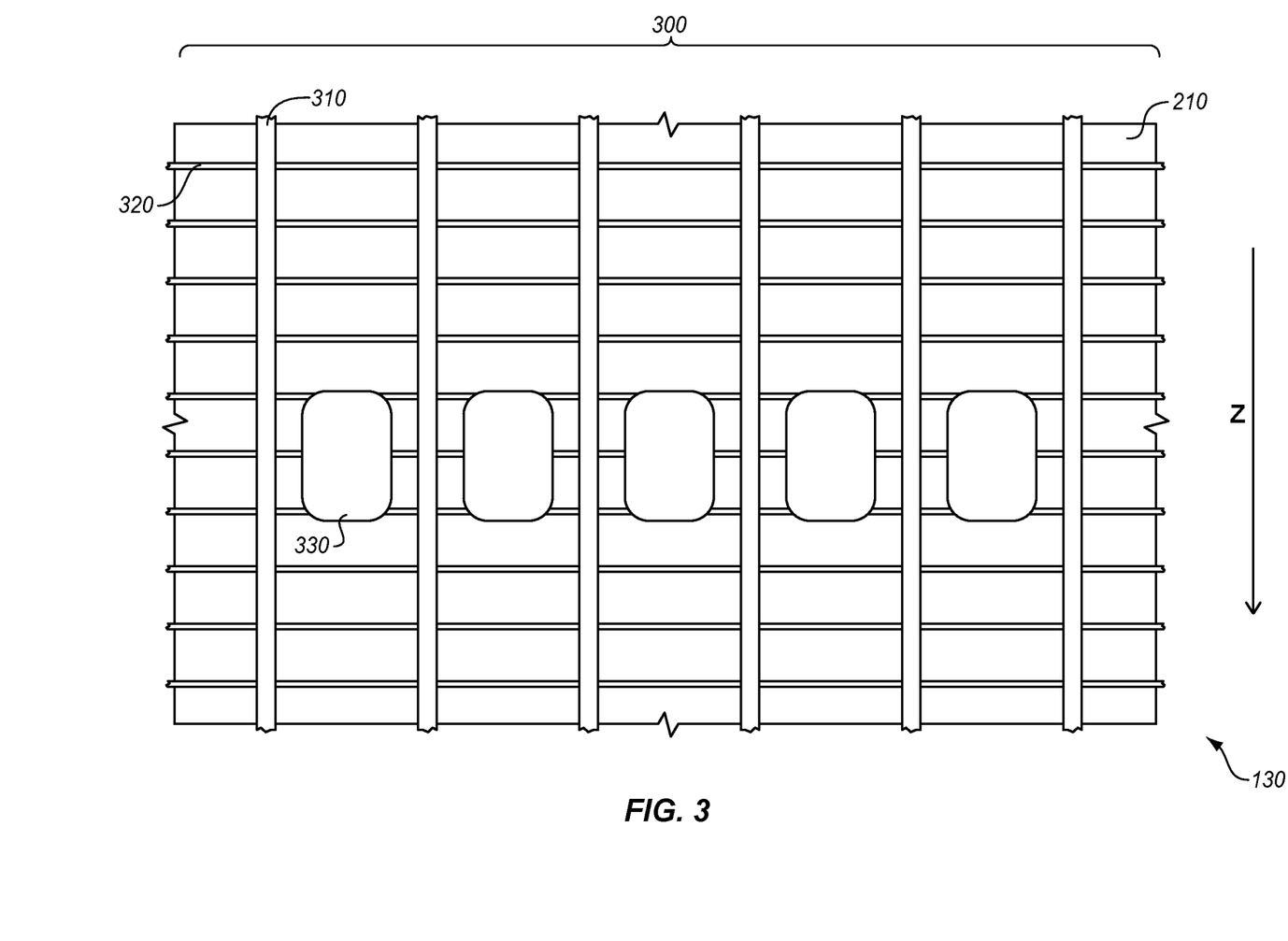
FIG. 3 is a diagram illustrating a section of aircraft fuselage in an exemplary embodiment.

FIG. 3 is a diagram illustrating a section of fuselage 130 of aircraft 100 in an exemplary embodiment. FIG. 3 is a view shown by view arrows 3 in FIG. 1. In FIG. 3, various structural components (310, 320, 330, 210) are illustrated without insulation for clarity. Frame 300 includes stringers 320 and frame elements 310. Stringers 320 connect (frame elements—these are typically called frames) 310 (e.g., ribs of the aircraft) together. Windows (e.g., window 330) penetrate through skin 210.

Figure 4:
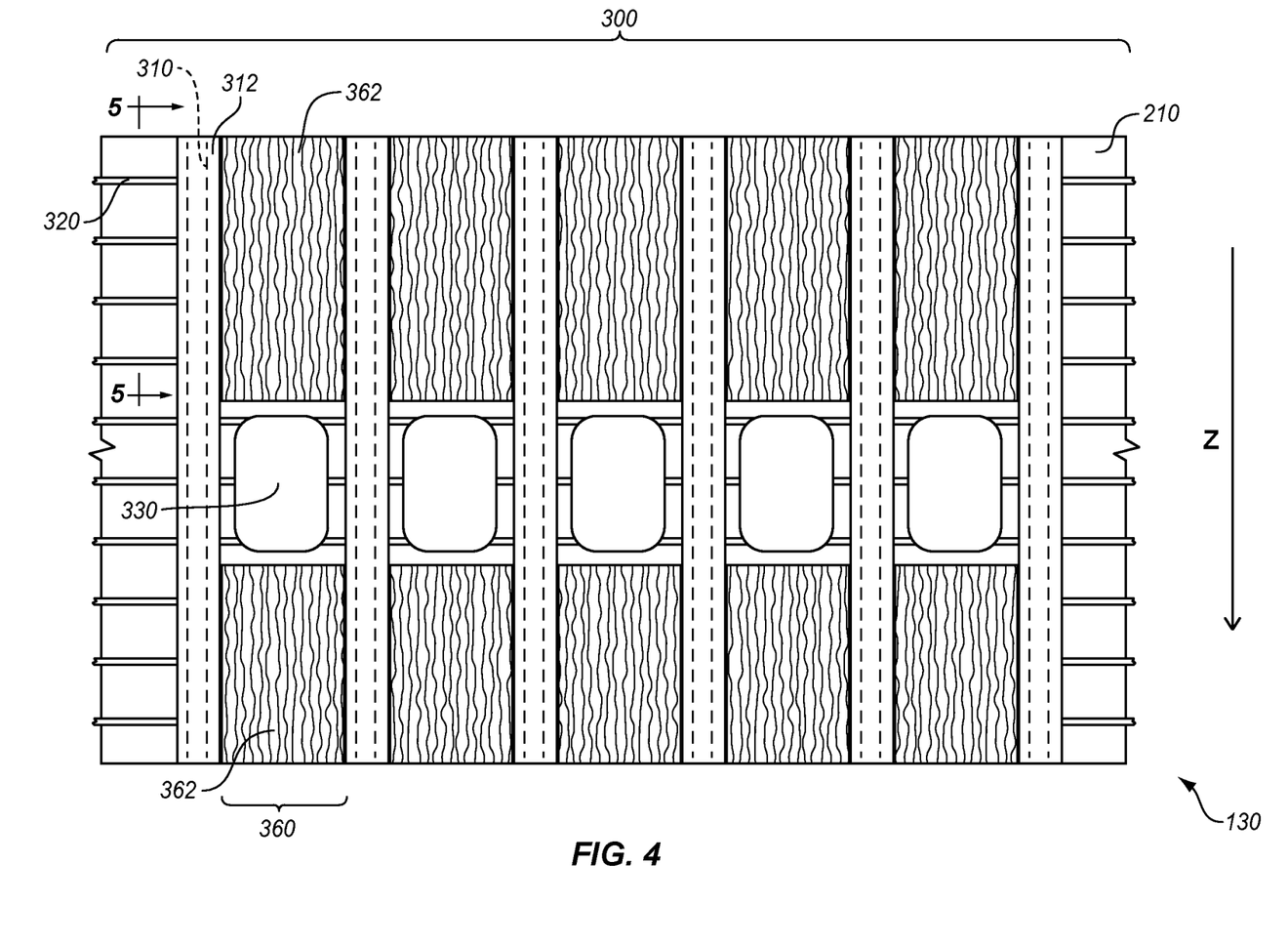
FIG. 4 is a diagram illustrating a section of insulated aircraft fuselage in an exemplary embodiment.

FIG. 4 is a diagram illustrating section 300 of fuselage 130 with insulation in an exemplary embodiment. FIG. 4 also utilizes the view shown by view arrows 3 in FIG. 1. In FIG. 4, the various structural components (310, 320, 330, 210) depicted in FIG. 3 are now insulated. As shown in FIG. 4, each frame element 310 is covered by an insulating cap strip liner 312. Furthermore, bays 360 formed between frame elements 310 are filled with insulating bay blankets 362. Bay blankets 362 are waterproof (e.g., impermeable to water, such that water cannot cross directly through the material of bay blankets 362 from either the cabin 230 of aircraft 100 to skin 210, or from skin 210 of aircraft 100 to cabin 230). Bay blankets 362 are also thermally insulating. Hence, bay blankets 362 prevent heat loss out of cabin 230. Bay blankets 362 are also arranged to ensure that liquid water does not permeate through bay blankets 362 when flowing along an outboard portion of (e.g., the backside/outside of) bay blankets 362.

Figure 5:
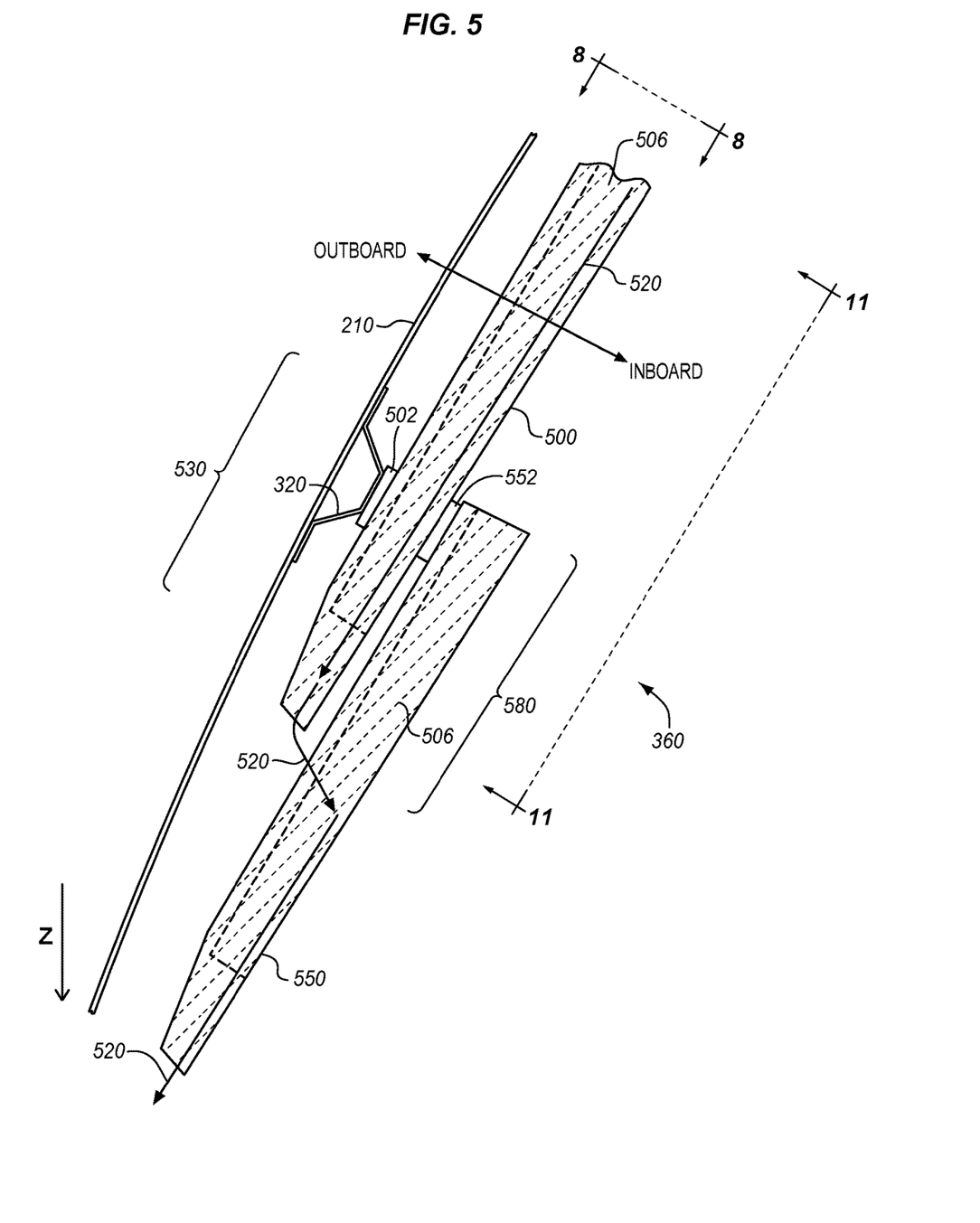
FIG. 5 is a side view of overlapping bay blankets of an aircraft in an exemplary embodiment.

FIG. 5 is a diagram illustrating a portion of a bay 360 situated at the top of aircraft 100, as shown in. According to FIG. 5, bay blanket 500 and bay blanket 550 (partially overlap/shingle over each other—this needs a ref # of both portions overlapping) such that water 520 drains from bay blanket 500 to bay blanket 550. Bay blankets 500 and 550 are each made of an insulating and/or waterproof material 506. Furthermore, portion 530 of bay blanket 500 overlaps portion 580 of bay blanket 550 such that lower portion 530 of bay blanket 500 is "shingled" over (i.e., outboard with respect to) upper portion 580 of bay blanket 550. In this manner, the arrangement of bay blankets 500 and 550 ensures that water 520 does not leak when draining from one bay blanket to the next.

FIG. 5 further illustrates that bay blankets 500 and 550 are affixed to stringer 320 via fixation elements 502 and 552. Bay blanket 500 is directly attached to stringer 320 via fixation element 502. In contrast, bay blanket 550 is attached to stringer 320 indirectly via fixation element 552 (which is affixed to bay blanket 500). The fixation elements described herein may comprise any suitable fasteners and/or adhesives. However, it may be desirable for these fixation elements to provide waterproof methods of attachment that do not result in leaks/punctures at a bay blanket (e.g., 500, 550). Fixation elements described herein may comprise mated combinations of hook-and-loop fabric tape, waterproof tape such as BMS5-157 Type 1 Class 3 Grade E Form 1 tape, snaps, other adhesive tapes, screws and/or nails, studs, rivets, stitching, etc.

Figures 6, 7:
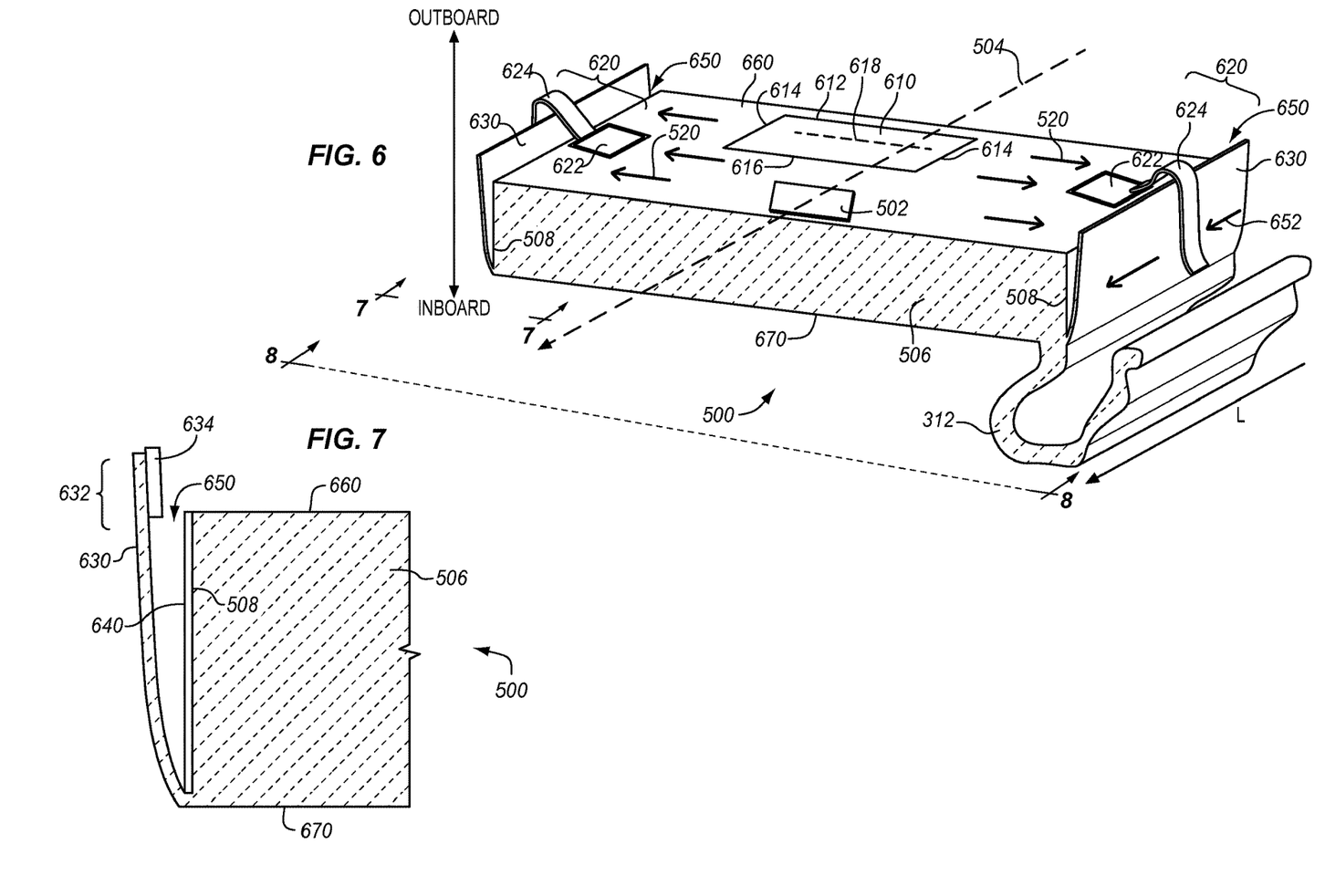
FIGS. 6-7 illustrate a bay blanket in an exemplary embodiment.

FIGS. 6-7 illustrate perspective and side views, respectively, of bay blanket 500 in an exemplary embodiment. In FIG. 6, an outboard surface 660 of bay blanket 500 is shown in detail. Water 520 dropping onto outboard surface 660 may flow towards the sides of bay blanket 500 until it reaches troughs 650, which are located proximate to faces 508 of insulation 506 (e.g., left and right faces of insulation 506) and extend along a length (L) of bay blanket 500. Water 520 draining into troughs 650 proceeds in a downward direction 652 toward a next bay blanket. Water may also drain along the center of bay blanket 500 without entering the troughs. An outer wall 630 of each trough 650 prevents water 520 from exiting bay blanket 500 in a lateral direction while water 520 is situated in a trough 650.

Bay blanket 500 is secured to frame elements 310 (shown in FIG. 8) by securement straps 620. Each securement strap 620 includes a fixation element 622, as well as a tensile strip 624 (e.g., a fabric strip) that is capable of bearing the weight of bay blanket 500 under load. Bay blanket 500 also includes an integrated cap strip liner 312 affixed to an inboard surface 670, as well as a fixation element 502 and a waterproof flap 610. Flap 610 is secured via waterproof means (e.g., via tape, waterproof stitching, etc.) at upward side 612 and/or lateral sides 614, but is open at downward side 616. This enables flap 610 to completely cover a penetration 618 through bay blanket 500, allowing draining water 520 to flow over flap 610 without entering penetration 618 (which would result in a leak).

Figure 8:
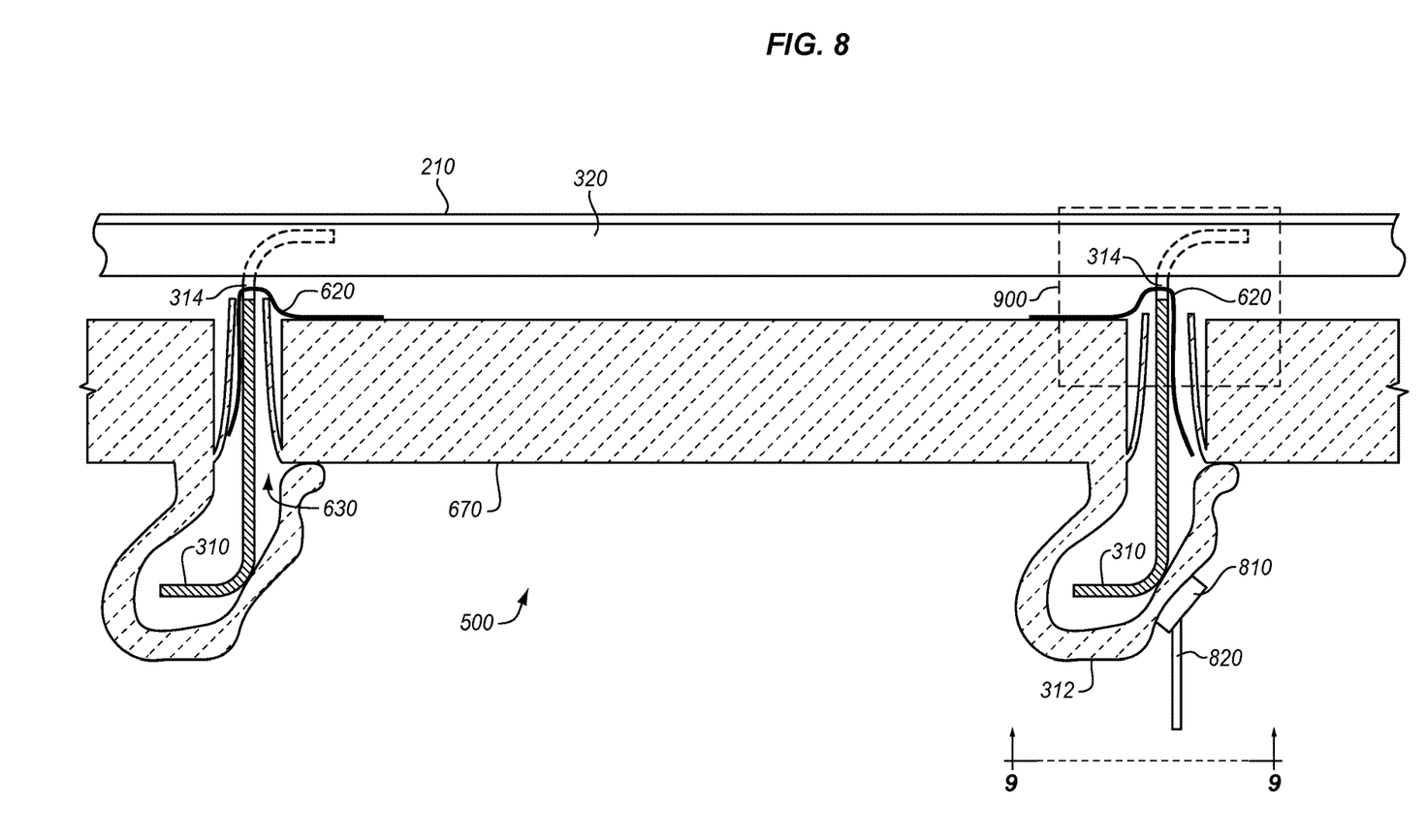
FIG. 8 illustrates a cut-through front view of an installed bay blanket in an exemplary embodiment.

FIG. 7 illustrates a side view of bay blanket 500. FIG. 7 is shown by view arrows 7 of FIG. 6. In this side view, outer wall 630 and inner wall 640 of a trough 650 are shown. Inner wall 640 is located proximate to a leftward face 508 of insulation 506, while outer wall 630 is located proximate to a frame element (as shown in FIG. 8). These walls (630, 640) may exhibit a thickness of several millimeters of waterproof material in order to ensure that trough 650 is not rendered nonfunctional by wear and tear as an aircraft operates. The walls (630, 640) extend from inboard surface 670 to outboard surface 660 of insulation 506. FIG. 7 further illustrates that outer wall 630 includes a portion 632 that extends past insulation 506 in the outboard direction. This portion 632 prevents draining water from passing over or across trough 650 and exiting bay blanket 500.

A channeling element 634 is configured to bear the weight of portion 632 if portion 632 droops over and onto outboard surface 660 of insulation 506. Channeling element 634 is also adapted to allow water to flow through it. For example, channeling element 634 may comprise hook fabric tape attached to portion 632. Such a fabric may resist some amount of force (e.g., compression) from the weight of portion 632 pressing down on channeling element 634, while also defining numerous small, semi-random channels for water flow. For example, channeling element 634 may comprise a porous material with many porous openings that define the semi-random channels within channeling element 634. Channeling element 634 therefore ensures that if portion 632 sags, bows, or dips into contact with insulation 506, water will travel through channeling element 634 underneath portion 632 and into trough 650, instead of damming at portion 632 and then flowing over portion 632.

FIG. 8 illustrates a cut-through view of an installed bay blanket 500 in an exemplary embodiment. FIG. 8 is shown by view arrows 8 of FIG. 6. FIG. 8 illustrates that frame elements 310 are covered by cap strip liners 312. Cap strip liners 312 are penetrated at various locations by brackets 820. Moisture retaining elements 810 (e.g., felt liners, etc.) are placed proximate to brackets 820 in order to ensure that water is absorbed instead of dripping into a cabin of the aircraft.

In this embodiment, each bay blanket is hung between intervening frame elements 310 via securements straps 620. Each cut-out 314 (known colloquially as a "mouse hole") in frame element 310 is dimensioned to accommodate the passage of a stringer through frame element 310. Securement strap 620 penetrates through a cut-out 314 in a frame element 310 and is secured in place. Further details of this securement technique will be illustrated with respect to FIG. 9 below.

Figure 9:
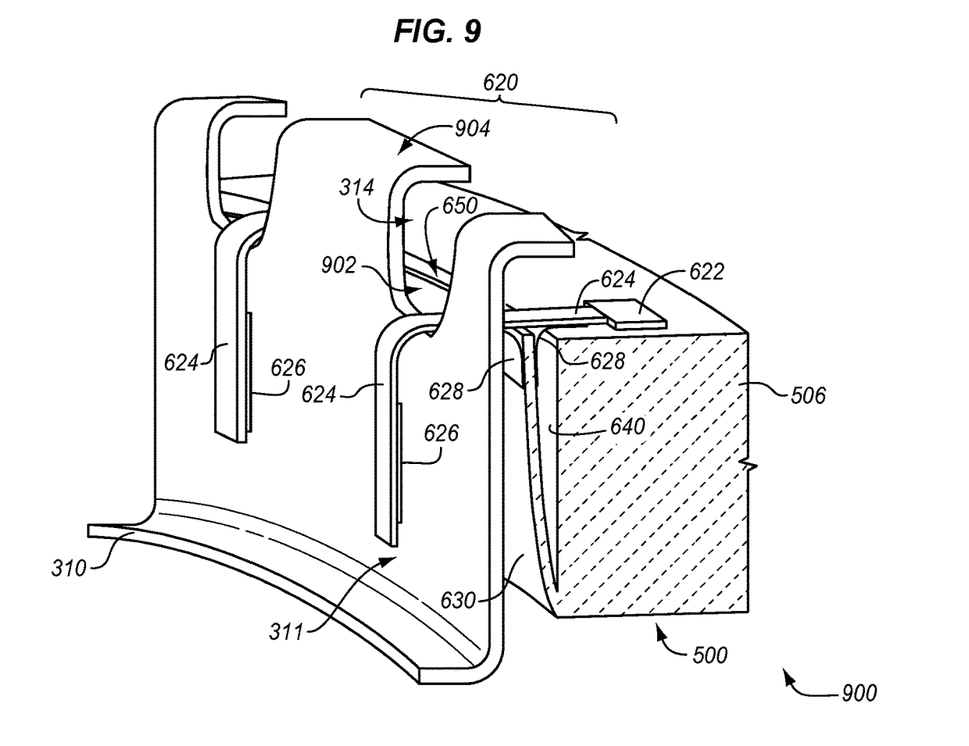
FIG. 9 is a cut-through diagram illustrating securement straps that attach a bay blanket to a frame element in an exemplary embodiment.

FIG. 9 is a cut-through diagram illustrating securement straps 620 that attach a bay blanket 500 to a frame element 310 in an exemplary embodiment. Specifically, FIG. 9 illustrates a zoomed-in version of section 900 of FIG. 8 and as also shown by view arrows 9 of FIG. 9. According to FIG. 9, tensile strip 624 of securement strap 620 extends through cut-out 314 of frame element 310 to a distal side 311 of frame element 310 (i.e., a side of frame element 310 that is distal from, as opposed to proximate to, bay blanket 500). Tensile strip 624 includes a fixation element 626 (e.g., hook-and-loop fastener tape, a bolt or nut for mating to frame element 310, etc.) which is affixed to frame element 310. In this configuration, load applied to securement strap 620 by bay blanket 500 (and/or any corresponding water) places fixation element 626 into shear. Particularly for hook-and-loop fastener tape embodiments of fixation element 626, this enhances the ability of fixation element 626 to bear load. A stringer passes through frame element 310 as indicated at location 902, while frame element 310 is attached to aircraft skin as indicated at location 904.

FIG. 9 also illustrates that in one embodiment, securement strap 620 may be secured to outer wall 630 by fixation elements 628. Affixing securement strap 620 in this manner to outer wall 630 provides a benefit by enforcing spacing between outer wall 630 and inner wall 640, which ensures that trough 650 is not overly wide or overly narrow at installation. This technique also ensures that outer wall 630 does not fall down during the installation of bay blanket 500.

Figure 10:
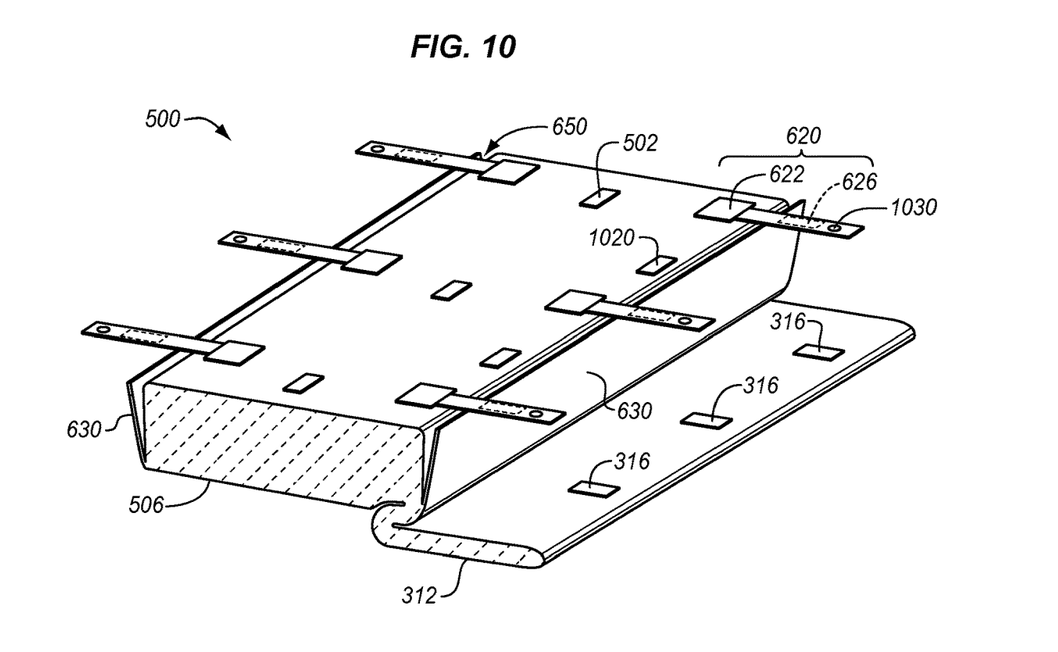
FIG. 10 is a cut-through diagram illustrating a bay blanket awaiting installation in an aircraft in an exemplary embodiment.

FIG. 10 is a cut-through diagram illustrating a bay blanket 500 awaiting installation in an aircraft in an exemplary embodiment. In FIG. 10, securement straps 620 are extended and ready for attachment to frame elements 310. Meanwhile, fixation elements 502 await affixation to stringers 320. In this embodiment, one fixation element 502 is attached to every other stringer 320 along the length of bay blanket 500. Fixation elements 1020 may be utilized to secure insulation 506 to outer walls 630 of troughs 650. This may help to ensure that a trough 650 maintains its intended shape during installation and over long periods of use. Alignment marks 1030 on straps 620 are provided to enhance the ease of installation, by aligning with a feature on a frame element 310 when strap 620 is snug. Cap strip liner 312 is illustrated as including fixation elements 316, which secure cap strip liner 312 to a frame element 310.

Figure 11:
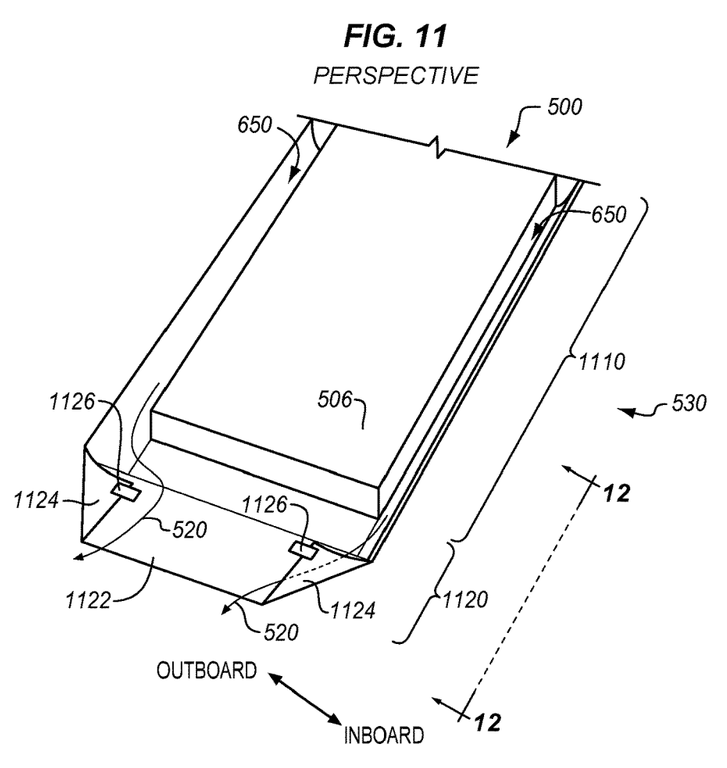
FIGS. 11-13 illustrate a lower portion of a bay blanket in an exemplary embodiment.
Figure 12:
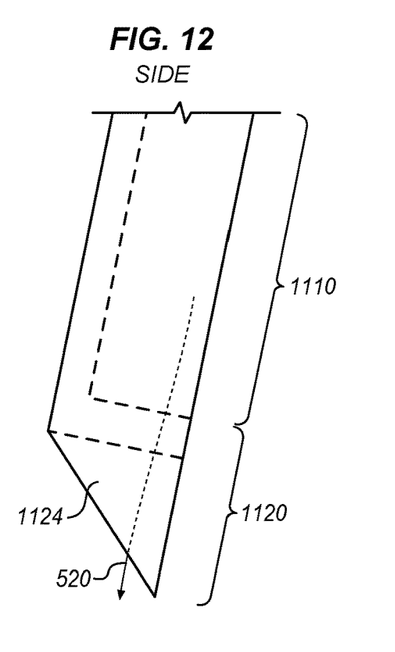
Figure 13:
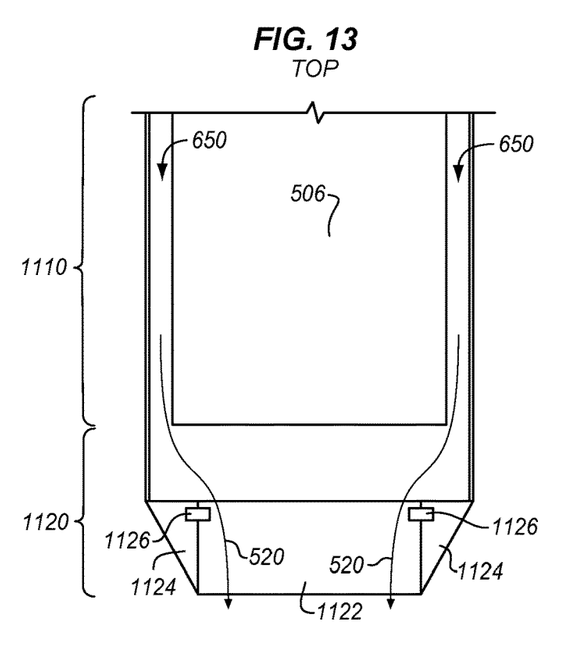

FIGS. 11-13 illustrate a lower portion 1120 of a bay blanket 500 in an exemplary embodiment. For example, FIG. 11 is shown by view arrows 11 of FIG. 5. FIGS. 12-13 are shown by view arrows 12 of FIG. 11. These FIGS. show that in lower portion 1120 (as opposed to upper portion 1110), troughs 650 extend beyond insulation 506 and connect with each other, forming a unified trough 1122 for water 520 to flow through. In this embodiment, corners 1124 of lower portion 1120 are folded back onto bay blanket 500 and secured in place (e.g., via tape 1126).

Figure 14:
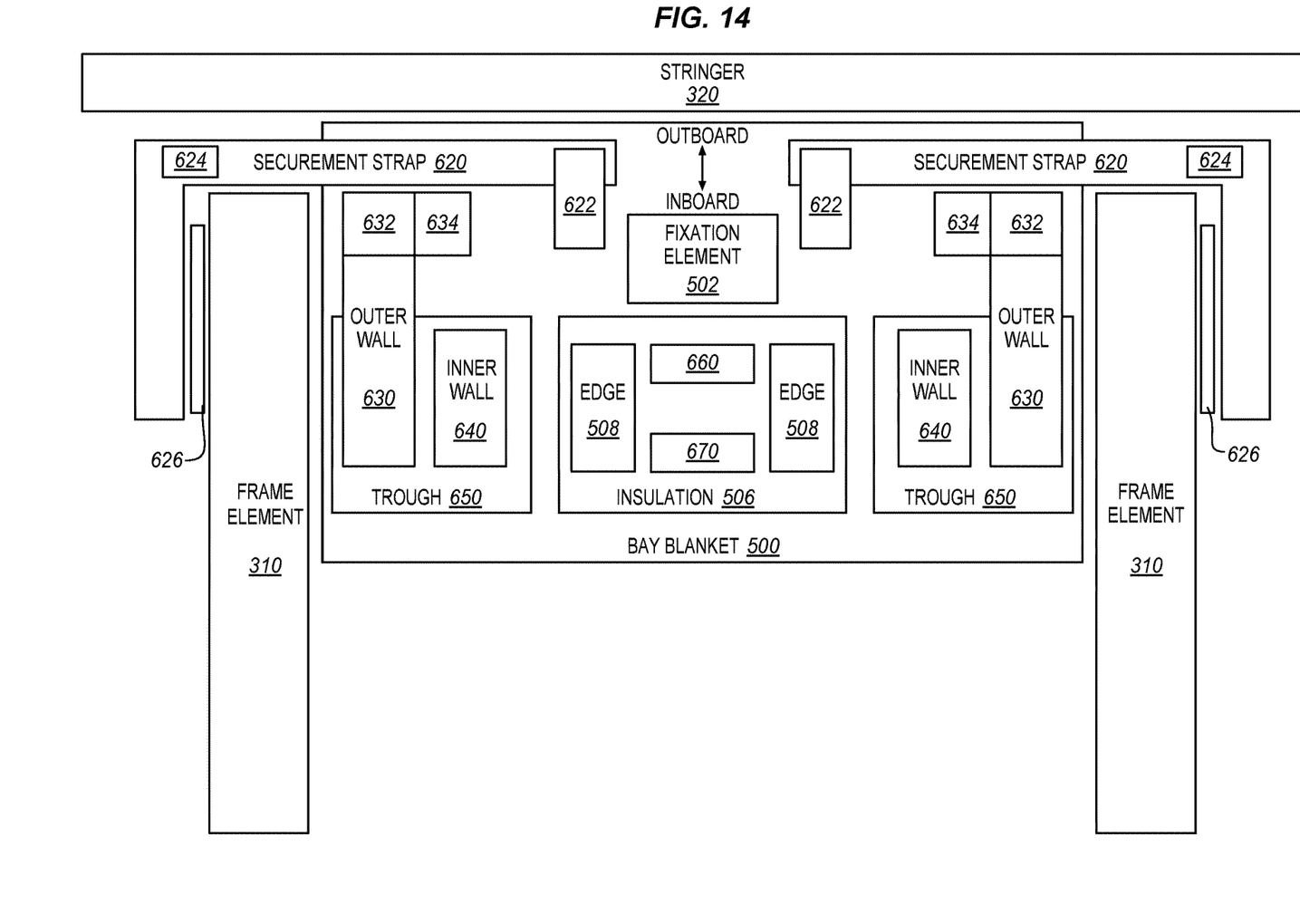
FIG. 14 is a block diagram of a bay blanket in an exemplary embodiment.

FIG. 14 is a block diagram of a bay blanket 500 in an exemplary embodiment. In this embodiment, bay blanket 500 comprises insulation 506, troughs 650, and securement straps 620. Bay blanket 500 is secured to frame elements 310 by tensile portions 624 of securement straps 620. Tensile portions 624 are secured to frame elements 310 via fixation elements 626. Furthermore, fixation element 502 couples insulation 506 to stringer 320. While bay blanket 500 is secured in a bay, it drains water from an outboard surface 660 into troughs 650. Troughs 650 extend from inboard surface 670 to outboard surface 660, and are defined by inner wall 640 and outer wall 630. Inner wall 640 is secured to a face 508 of insulation 506. Outer wall 630 includes portion 632, which extends in an outboard direction beyond outboard surface 660 of insulation 506. A channeling element 634 is attached to portion 632, to enable water to travel through channeling element 634 if portion 632 droops onto insulation 506.

Figure 15:
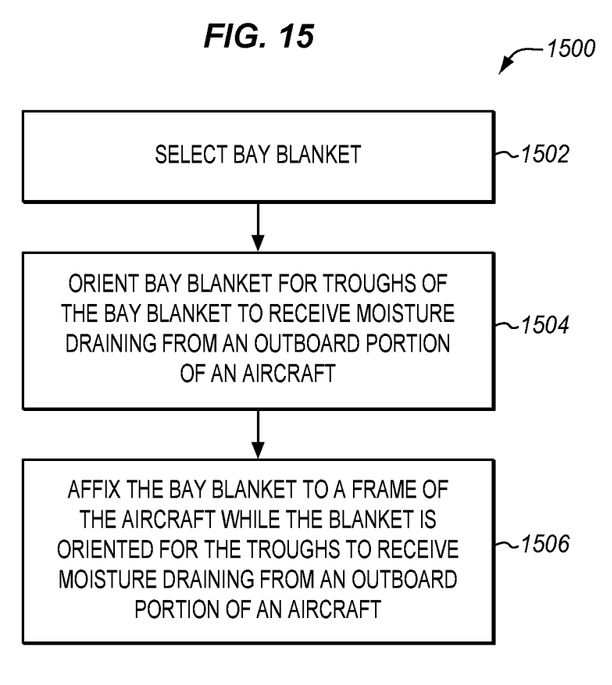
FIG. 15 is a flowchart illustrating a method for installing a bay blanket in an exemplary embodiment.

Further details of the operations of bay blankets discussed herein will be discussed with regard to method 1500 of FIG. 15. FIG. 15 is a flowchart illustrating a method for installing a bay blanket in an exemplary embodiment. The steps of method 1500 are described with reference to bay blanket 500 of FIG. 14, but those skilled in the art will appreciate that method 1500 may be performed in other environments with bay blankets implementing similar innovations. The steps of the flowcharts described herein are not all inclusive and may include other steps not shown. The steps described herein may also be performed in an alternative order.

According to FIG. 15, a bay blanket 500 is selected for installation (step 1502). The bay blanket 500 is oriented for troughs 650 of the bay blanket 500 to receive moisture draining from an outboard portion of an aircraft (e.g., water draining from skin 210) (step 1504). Bay blanket 1400 is also affixed to the frame of aircraft 100 via fixation elements (e.g., 612, 502) while the troughs are oriented properly (step 1506). This enable bay blanket 1400 to hang from the frame of the aircraft and facilitate the draining of water. The method may further comprise folding corners of the bay blanket towards a center of an outboard surface of the bay blanket, and affixing the corners in place on the bay blanket.

In a further embodiment, the method may further comprise repeating the above steps, once per bay blanket, while overlapping the ends of the bay blankets to form a shingled pattern. That is, blankets that are vertically higher are installed so that their lower portions extend over upper portions of blankets that are vertically lower. The lower portions are further outboard than the upper portions.

Figure 16:
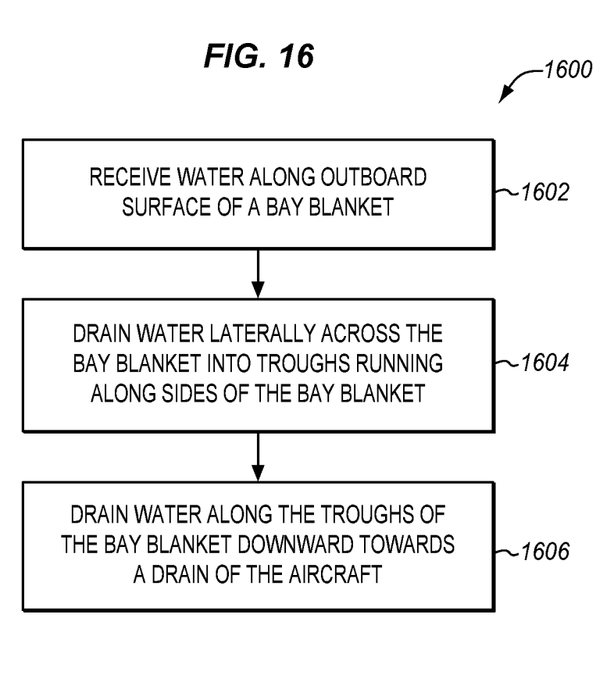
FIG. 16 is a flowchart illustrating a method for draining water via a bay blanket in an exemplary embodiment.

FIG. 16 is a flowchart illustrating a method 1600 for draining water via a bay blanket 500 in an exemplary embodiment. Method 1600 includes receiving water along an outboard surface 660 of a bay blanket 500 comprising insulation 506 (step 1602). Method 1600 further includes receiving water traveling towards the sides of the bay blanket into troughs 650 running along sides of the bay blanket. The troughs 650 extend from an inboard surface of insulation of the bay blanket to an outboard surface of insulation of the bay blanket (step 1604). Method 1600 further includes draining water along the troughs downward, towards a drain of an aircraft (step 1606).

Figure 17:
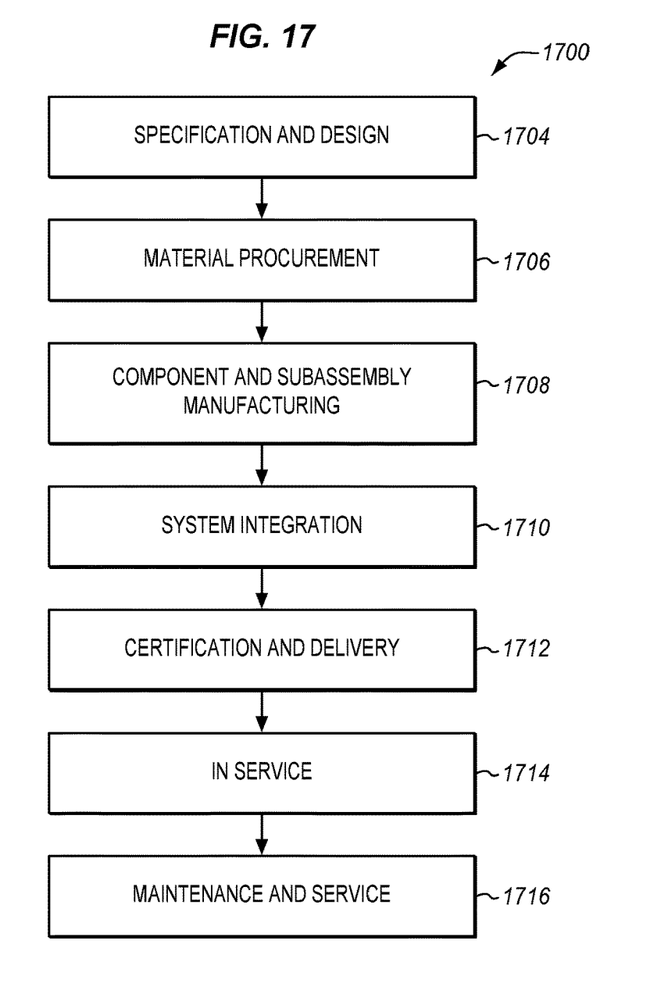
FIG. 17 is a flow diagram of aircraft production and service methodology in an exemplary embodiment.
Figure 18:
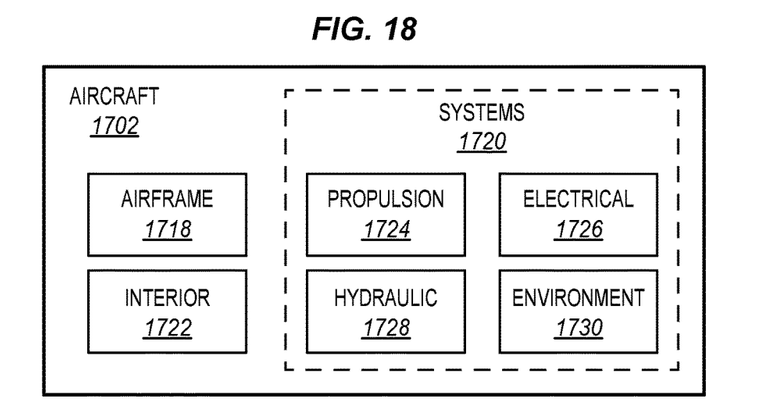
FIG. 18 is a block diagram of an aircraft in an exemplary embodiment.

Referring more particularly to the drawings, embodiments of the disclosure may be described in the context of an aircraft manufacturing and service method 1700 as shown in FIG. 17 and an aircraft 1702 as shown in FIG. 18. During pre-production, exemplary method 1700 may include specification and design 1704 of the aircraft 1702 and material procurement 1706. During production, component and subassembly manufacturing 1708 and system integration 1710 of the aircraft 1702 takes place. Thereafter, the aircraft 1702 may go through certification and delivery 1712 in order to be placed in service 1714. While in service by a customer, the aircraft 1702 is scheduled for routine maintenance and service 1716 (which may also include modification, reconfiguration, refurbishment, and so on).

In various embodiments, the improved techniques and components described herein may be utilized such that materials for bay blankets are procured in stage 1706, then utilized in stage 1708 in order to assemble the materials into a bay blanket in stage 1708. In stage 1710, the assembled bay blanket may be attached to a frame of an aircraft, and in stage 1714 the bay blanket within the aircraft enhances drainage within an airframe 1718 and/or interior 1722 while the aircraft is operating. In stage 1716, the bay blanket may be replaced or repaired by technicians for the aircraft.

Each of the processes of method 1700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 1702 produced by exemplary method 1700 may include an airframe 1718 with a plurality of systems 1720 and an interior 1722. Examples of high-level systems 1720 include one or more of a propulsion system 124, an electrical system 1726, a hydraulic system 1726, and an environmental system 1730. Any number of other systems may be included. Although an aerospace example is shown, the principles of the invention may be applied to other industries, such as the automotive industry.

Apparatus and methods embodied herein may be employed during any one or more of the stages of the production and service method 1700. For example, components or subassemblies corresponding to production stage 1708 may be fabricated or manufactured in a manner similar to components or subassemblies produced while the aircraft 1702 is in service. Also, one or more apparatus embodiments, method embodiments, or a combination thereof may be utilized during the production stages 1708 and 1710, for example, by substantially expediting assembly of or reducing the cost of an aircraft 1702. Similarly, one or more of apparatus embodiments, method embodiments, or a combination thereof may be utilized while the aircraft 1702 is in service, for example and without limitation, to maintenance and service 1716.

Although specific embodiments are described herein, the scope of the disclosure is not limited to those specific embodiments. The scope of the disclosure is defined by the following claims and any equivalents thereof.

The invention claimed is:

1. An apparatus comprising:
a bay blanket configured to insulate an aircraft, the bay blanket comprising:
insulation;
a first trough running along a length of a face of the insulation and adapted to receive water draining from an outboard side of the insulation, the first trough comprising sidewalls that meet at an inboard side of the insulation and extend from the inboard side to the outboard side; and
a second trough running along a length of a rightward face of the insulation and adapted to receive water draining from the outboard side, the second trough comprising sidewalls that meet at the inboard side and extend from the inboard side to the outboard side.

2. The apparatus of claim 1 further comprising:
securement straps that are affixed to the insulation and that are adapted to thread through a frame element of the aircraft to secure the bay blanket to the aircraft.

3. The apparatus of claim 2 wherein:
the securement straps are each also affixed to an outer sidewall of a trough.

4. The apparatus of claim 2 wherein:
the securement straps are each secured to a frame element via hook and loop fastener tape, and are each oriented to force the hook and loop fastener tape into shear when the securement strap bears the weight of the bay blanket.

5. The apparatus of claim 1 wherein:
the bay blanket further includes a flap that is affixed to the insulation and covers a penetration that extends from the outboard side to the inboard side of the insulation.

6. The apparatus of claim 1 further comprising:
reinforcement tape securing sidewalls of the troughs to the insulation.

7. The apparatus of claim 1 wherein:
each trough further comprises an overhang extending in an outboard direction beyond the outboard side of the insulation.

8. The apparatus of claim 7 wherein:
each trough further comprises a channeling element that continues along a length of the overhang;
the channeling element comprises a porous material that channels water underneath the overhang when the overhang sags downward towards the insulation.

9. The apparatus of claim 1 wherein:
corners at an end of the length of the bay blanket are folded towards a center of the bay blanket and affixed to the insulation.

10. An apparatus comprising:
a frame of an aircraft;
a bay blanket configured to insulate the aircraft, the bay blanket comprising:
insulation;
a first trough running along a length of a leftward face of the insulation and adapted to receive water draining from an outboard side of the insulation, the first trough comprising sidewalls that meet at an inboard side of the insulation and extend from the inboard side to the outboard side; and
a second trough running along a length of a rightward face of the insulation and adapted to receive water draining from the outboard side, the second trough comprising sidewalls that meet at the inboard side and extend from the inboard side to the outboard side; and
securement straps that are threaded through the frame and affix the bay blanket to the aircraft.

11. The apparatus of claim 10 wherein:
the securement straps are each secured to the frame, and are each oriented to be placed into shear with the frame when the securement strap bears the weight of the bay blanket.

12. The apparatus of claim 10 wherein:
the securement straps are secured to the frame by hook and loop fastener tape.

13. The apparatus of claim 10 wherein:
the bay blanket further includes a flap that is affixed to the insulation and covers a penetration from the outboard side to the inboard side of the insulation.

14. The apparatus of claim 10 further comprising:
reinforcement tape securing sidewalls of the troughs to the insulation.

15. The apparatus of claim 10 wherein:
each trough further comprises an overhang extending in an outboard direction beyond the outboard side of the insulation.

16. The apparatus of claim 15 wherein:
each trough further comprises a channeling element that continues along a length of the overhang;
the channeling element comprises a porous material that channels water underneath the overhang when the overhang sags downward towards the insulation.

17. The apparatus of claim 10 wherein:
corners at an end of the length of the bay blanket are folded towards a center of the bay blanket and affixed to the insulation.

18. A method of draining water for an aircraft, the method comprising:
receiving water along an outboard surface of a bay blanket comprising insulation;
redirecting water at the outboard surface that is flowing towards sides of the bay blanket, via troughs along the sides of the bay blanket that that extend from an inboard side of the insulation towards an outboard side of the insulation; and
draining water along the troughs of the bay blanket downward towards a drain of the aircraft.

19. The method of claim 18 wherein:
each trough includes an overhang extending in an outboard direction beyond the outboard side of the insulation.

20. The method of claim 18 further comprising:
hanging the bay blanket from securement straps attached to a frame of the aircraft.

21. A method comprising:
selecting a bay blanket comprising insulation and troughs that extend from an inboard side of the insulation towards an outboard side of the insulation;
orienting the bay blanket for the troughs to receive moisture draining from an outboard portion of the bay blanket; and
affixing the bay blanket to a frame of the aircraft while the blanket is oriented for the troughs to receive water from an outboard side of the bay blanket.

22. The method of claim 21, further comprising:
affixing another bay blanket that partially overlaps the bay blanket in a shingled configuration.

* * * * *

UNITED STATES PATENT AND TRADEMARK OFFICE
CERTIFICATE OF CORRECTION

PATENT NO. : 10,604,224 B2
APPLICATION NO. : 14/993402
DATED : March 31, 2020
INVENTOR(S) : Irwin et al.

It is certified that error appears in the above-identified patent and that said Letters Patent is hereby corrected as shown below:

In the Claims

Column 10 (Line 22) Claim 18, Line 7 please remove the duplicate word "that".

Signed and Sealed this
Nineteenth Day of May, 2020

Andrei Iancu
*Director of the United States Patent and Trademark Office*